(12) United States Patent
Kim et al.

(10) Patent No.: US 10,486,749 B2
(45) Date of Patent: Nov. 26, 2019

(54) INTEGRATED HOT STAMPING STRUCTURE (71) Applicants: Hyundai Motor Company, Seoul (KR); Kia Motors Corporation, Seoul (KR)

(72) Inventors: Sung Won Kim, Suwon-si (KR); Heedae Oh, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 287 days.

(21) Appl. No.: 15/610,328

(22) Filed: May 31, 2017

(65) Prior Publication Data

US 2018/0162451 A1 Jun. 14, 2018

(30) Foreign Application Priority Data

Dec. 13, 2016 (KR) .................. 10-2016-0169846

(51) Int. Cl.
| | | |
|---|---|---|
| *B21C 1/00* | (2006.01) | |
| *B21D 28/06* | (2006.01) | |
| *B62D 25/04* | (2006.01) | |
| *B21D 22/02* | (2006.01) | |
| *B21D 53/88* | (2006.01) | |

(52) U.S. Cl.
CPC ........... *B62D 25/04* (2013.01); *B21D 22/022* (2013.01); *B21D 53/88* (2013.01)

(58) Field of Classification Search
None
See application file for complete search history.

(56) References Cited

U.S. PATENT DOCUMENTS

| 7,396,072 | B2 | 7/2008 | Fischer et al. | |
|---|---|---|---|---|
| 2003/0019615 | A1* | 1/2003 | Igami | F28F 9/0212 165/143 |
| 2008/0001434 | A1* | 1/2008 | Henkelmann | B62D 25/04 296/187.12 |
| 2014/0144973 | A1 | 5/2014 | Pohl et al. | |
| 2014/0203592 | A1* | 7/2014 | Nagwanshi | B62D 29/004 296/187.01 |
| 2017/0233007 | A1* | 8/2017 | Park | B62D 25/025 296/203.03 |
| 2018/0362087 | A1* | 12/2018 | Kodama | B62D 21/152 |

FOREIGN PATENT DOCUMENTS

| JP | 2002-178069 A | | 6/2002 | |
|---|---|---|---|---|
| KR | 10-0267900 B1 | | 10/2000 | |
| KR | 20030006002 A | * | 1/2003 | |
| KR | 10-1509966 B1 | | 4/2015 | |
| WO | WO-2016098731 A1 | * | 6/2016 | ........... B62D 21/152 |

OTHER PUBLICATIONS

Jang, machine translation of KR 10-0267900, Oct. 16, 2000 (Year: 2000).*

* cited by examiner

*Primary Examiner* — David Sample
*Assistant Examiner* — Mary I Omori
(74) *Attorney, Agent, or Firm* — Morgan, Lewis & Bockius LLP (57) ABSTRACT

An integrated hot stamping structure formed by integrally coupling a plurality of blanks and hot stamping-molding the integrated blanks, may include a reinforcing member disposed in a hot stamping area of a predetermined strength reinforcing portion configured for absorbing a shock and reinforcing local rigidity of the strength reinforcing portion.

9 Claims, 9 Drawing Sheets

INTEGRATED HOT STAMPING STRUCTURE

CROSS-REFERENCE TO RELATED APPLICATION

The present application claims priority to Korean Patent Application No. 10-2016-0169846 filed on Dec. 13, 2016, the entire contents of which are incorporated herein for all purposes by this reference.

BACKGROUND OF THE INVENTION

Field of the Invention

The present invention relates to an integrated hot stamping structure, and more particularly, to an integrated hot stamping structure having different strengths in respective sections as an integrated hot stamping side structure of a vehicle body.

Description of Related Art

In general, components having various strengths are used in a vehicle. For example, parts which need to absorb energy require a comparatively low strength when the vehicles collide with each other or are overturned, and a part which requires maintaining a shape for securing a survival compartment of an occupant is required.

When the strength of the part which needs to absorb energy during the collision is excessively high, shock energy cannot be appropriately absorbed and is transferred to other parts. As a result excessive shock can be transferred to the occupants and other components of the vehicle.

In the vehicle, a light weight structure and cost reductions are continuously required, and as a result, one component needs to have partially different heterogeneous strengths. A partial portion of the component requires a high strength to protect the occupant, but the partial portion also requires a relatively low strength to absorb the shock energy. Examples of the component may representatively include vehicle body components related with side panels of a vehicle.

Therefore, in the related art, a hot stamping component manufactured through a tailor welded blanks (TWB) technology and a hot stamping technology is adopted. Herein, the TWB technology is a method that cuts different steel plates having different thicknesses, strengths, and materials with appropriate sizes and shapes, and welds the steel plates with a laser to process the welded steel plates into products having the desired shapes. In addition, the hot stamping technology is a method that molds a steel material heated at a high temperature with a press and thereafter, rapidly cools the molded steel material and increases the strength of the steel material.

Therefore, the TWB hot stamping technology as a technique that press-molds the steel plate manufactured through the TWB method may take both advantages of the TWB and the hot stamping. The TWB hot stamping technology is disclosed in U.S. Pat. No. 7,396,072 and US Patent Unexamined Publication No. 2014-0144973.

However, the integrated hot stamping component in the related art, to which the TWB hot stamping technology is applied, absorbs a shock in a hot stamping area having a relatively low strength during a side collision of the vehicle. Since cross-sectional thicknesses and strengths of shock absorption portions are the same as each other, the shock absorption portion is easily ruptured, and as a result collision performance may deteriorate.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Exemplary embodiments of the present invention have been made in an effort to provide an integrated hot stamping structure configured to prevent a rupture in a hot stamping area configured for absorbing shock energy during a collision of a vehicle.

Various aspects of the present invention are directed to providing an integrated hot stamping structure formed by integrally coupling a plurality of blanks and hot stamping-molding the integrated blanks, including: a reinforcing member disposed in a hot stamping area of a predetermined strength reinforcing portion configured for absorbing a shock and reinforcing local rigidity of the strength reinforcing portion.

In the integrated hot stamping structure according to the exemplary embodiment of the present invention, the reinforcing member may be inserted into a predetermined vertical portion on at least one side of the strength reinforcing portion having both sides.

In the integrated hot stamping structure according to the exemplary embodiment of the present invention, the reinforcing member may support an external plane and an internal plane of the side and be welded to the external plane.

In the integrated hot stamping structure according to the exemplary embodiment of the present invention, the reinforcing member may be fitted and disposed in a slit which elongates on the side of the strength reinforcing portion in a vertical direction thereof. In the integrated hot stamping structure according to the exemplary embodiment of the present invention, the reinforcing member may include both flange parts which are extended to both peripheries of the slit, and support the external plane of the side and is welded to the external plane, and an overlap part which is integrally connected to both flange parts and supports the internal plane of the side through the slit.

In the integrated hot stamping structure according to the exemplary embodiment of the present invention, the overlap part may be provided as at least two-fold overlap layers.

In the integrated hot stamping structure according to the exemplary embodiment of the present invention, the reinforcing member may include a main reinforcing element of four folds or more, which includes both flange parts, the overlap layer, and a cross section of the strength reinforcing portion. In the integrated hot stamping structure according to the exemplary embodiment of the present invention, the overlap layer may be provided to be extended externally to both flange parts.

In the integrated hot stamping structure according to the exemplary embodiment of the present invention, the reinforcing member may include a sub reinforcing portion of three folds or more, which includes an extended part of the overlap layer and the cross section of the strength reinforcing portion.

In the integrated hot stamping structure according to the exemplary embodiment of the present invention, the overlap part may have a void between the internal plane of the side and the overlap layer.

In the integrated hot stamping structure according to the exemplary embodiment of the present invention, the reinforcing member may be made of a soft steel material.

In the integrated hot stamping structure according to the exemplary embodiment of the present invention, the integrated hot stamping structure may include an integrated side panel.

In the integrated hot stamping structure according to the exemplary embodiment of the present invention, the strength reinforcing portion may include a lower portion of an external pillar of the side panel.

According to exemplary embodiments of the present invention, a reinforcing member is assembled to a portion which absorbs shock during a collision of a vehicle in a hot stamping strength reinforcing area configured to increase a cross-section and a rigidity of the shock absorbing portion. Therefore, in the exemplary embodiments of the present invention, since a rupture and a partial rupture of the shock absorbing portion can be prevented through the reinforcing member, collision performance can be improved.

Furthermore, in the exemplary embodiment of the present invention, as the reinforcing member is assembled to the shock absorbing portion of the hot stamping strength reinforcing area, the collision performance can be improved without a secondary processing process for local softening and high-frequency softening of the shock absorbing portion.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

In the following description, dividing names of components into first, second and the like is to divide the names because the names of the components are the same as each other, and an order thereof is not particularly limited.

Throughout the specification, unless explicitly described to the contrary, the word "comprise" and variations such as "comprises" or "comprising", will be understood to imply the inclusion of stated elements but not the exclusion of any other elements.

In addition, the terms "unit", "means", "part", and "member", which are described in the specification, mean a unit of a comprehensive configuration that performs at least one function or operation.

Figure 1:
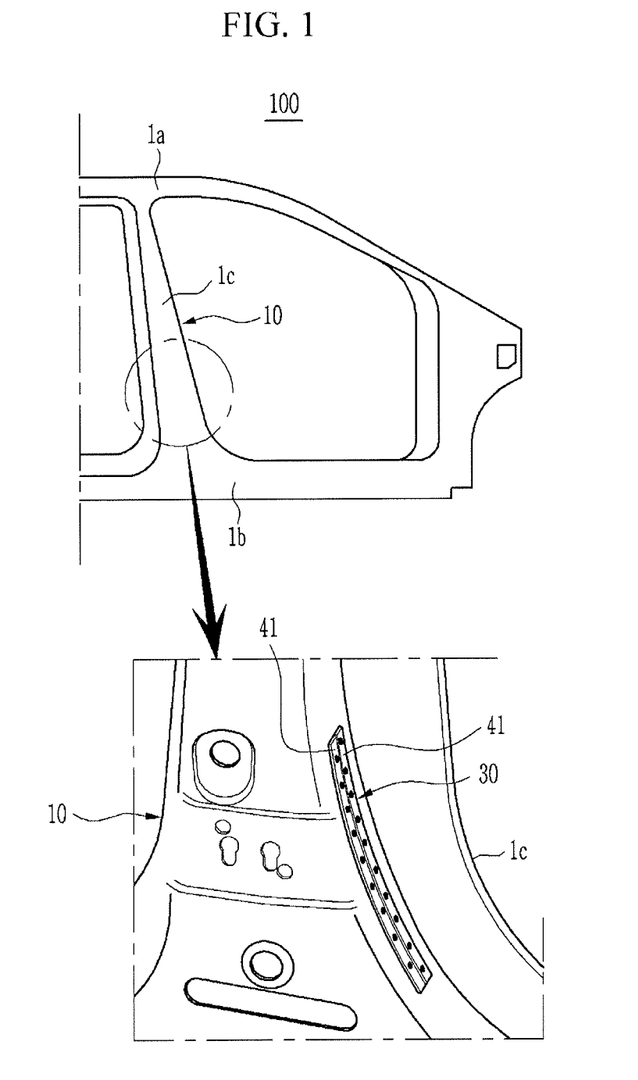
FIG. 1 is a diagram illustrating an integrated hot stamping structure according to an exemplary embodiment of the present invention.

FIG. 1 is a diagram illustrating an integrated hot stamping structure according to an exemplary embodiment of the present invention.

Referring to FIG. 1, the integrated hot stamping structure 100 according to the exemplary embodiment of the present invention as a vehicle body component may be applied to an integrated side panel which integrally connects a plurality of external pillars 1c between a roof side 1a and a sill side 1b.

For example, the integrated hot stamping structure 100 may be formed by integrally coupling hot stamping components including a roof side blank, a sill side blank, and an external pillar based on a side panel.

Furthermore, the integrated hot stamping structure 100 according to the exemplary embodiment of the present invention may be formed by hot stamping molding tailor welded blanks (TWB) processed in a desired form by cutting steel plates having different thicknesses, strengths, and materials with appropriate sizes and shapes, and welding the cut steel plates with a laser.

The integrated hot stamping structure 100 according to the exemplary embodiment of the present invention has a structure configured to prevent a rupture and a partial rupture in a hot stamping area (for example, a lower portion of a center external pillar of the side panel) configured for absorbing shock energy during a collision of a vehicle.

To this end, the integrated hot stamping structure 100 according to the exemplary embodiment of the present invention includes a reinforcing member 30 disposed in the hot stamping area of a strength reinforcing portion 10 configured to absorb the shock energy.

The hot stamping area of the strength reinforcing portion 10 means a strength reinforcing area acquired by integrally coupling a plurality of blanks and hot stamping molding the integrated blank through a hot stamping mold.

Herein, the hot stamping area of the strength reinforcing portion 10 as a high-strength part configured by a martensitic structure through a process that heats a steel plate containing boron at an austenite temperature and thereafter, molds and cools the steel plate with a press may include a part on the side panel, which protects an occupant when the vehicles collide with each other or the vehicle is overturned.

Further, the hot stamping area of the strength reinforcing portion 10 as an area having a slightly lower strength material than the high-strength part may absorb the shock energy when the vehicles collide with each other. However, hereinafter, the strength reinforcing portion 10 is defined below, furthermore, a lower portion connection part of the external pillar 1c connected to the sill side 1b.

In the exemplary embodiment of the present invention, the reinforcing member 30 is configured for reinforcing the local rigidity of the strength reinforcing portion 10. The reinforcing member 30 is also configured as the strength reinforcing portion 10 in a lower portion of the external pillar 1c connected to the sill side 1b, furthermore, in the lower portion of a center external pillar.

Herein, the external pillar 1c of the strength reinforcing portion 10 forms both sides (hereinafter, referred to as the side of the strength reinforcing portion) inward. Both sides of the strength reinforcing portion 10 are formed by circumferential planes in a vertical direction thereof.

The reinforcing member 30 may be assembled to at least one side of both sides of the strength reinforcing portion 10, and in the exemplary embodiment of the present invention, the reinforcing member 30 is assembled to one side (hereinafter, referred to as "side" for easy description) of the strength reinforcing portion 10 is described.

In addition, the reinforcing member 30 is disposed on the circumferential plane of the side of the strength reinforcing portion 10 in the vertical direction. The reinforcing member 30 is made of a soft steel material. The soft steel material is a steel material having a content of carbon in the range of 0.15% to 0.28% and may be defined as a material that absorbs the shock when the vehicles collide with each other or the vehicle is overturned.

In addition, the reinforcing member 30 is inserted and disposed in a vertical predetermined portion on the side of the strength reinforcing portion 10. The reinforcing member 30 is fitted and disposed in a slit 11 (hereinafter, see FIG. 2) which elongates on the side of the strength reinforcing portion 10 in the vertical direction. The slit 11 means a long-hole type slit hole. Herein, the reinforcing member 30 supports an external plane and an internal plane of the side of the strength reinforcing portion 10 through the slit 11, and is welded to the external plane.

Figure 2:
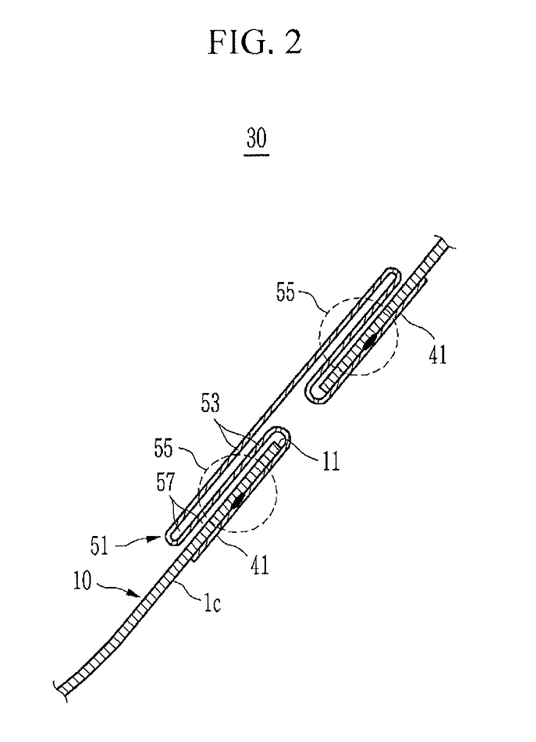
FIG. 2 is a diagram illustrating one example of a reinforcing member applied to the integrated hot stamping structure according to the exemplary embodiment of the present invention.

FIG. 2 is a diagram illustrating an example of a reinforcing member applied to the integrated hot stamping structure according to the exemplary embodiment of the present invention.

Referring to FIG. 1 and FIG. 2, the reinforcing member 30, according to the exemplary embodiment of the present invention, includes both flange parts 41 and an overlap part 51. Both flange parts 41, which support the external plane of the side of the strength reinforcing portion 10 disposed on the slit 11 in the vertical direction, are extended to both peripheries of the slit 11 and spot-welded to the external plane of the side.

The overlap part 51 which supports the internal plane of the side of the strength reinforcing portion 10 through the slit 11 is integrally connected to the end portions of both flange parts 41 facing each other with the slit 11 interposed therebetween. The overlap part 51 is pressed by an external force and formed with a plurality of layers to overlap with each other.

The overlap may be defined as a form in which the part (having an approximate 'U'-shape) integrally connected to the end portions of both flange parts 41 facing each other, and the end portions of both flange parts 41 and the part are not completely attached to each other and overlap with each other to be separated apart from each other.

The overlap part 51 is provided as overlap layers 53 of two folds or more, but is not limited thereto. However, in the exemplary embodiment of the present invention, the overlap part 51 includes two-fold overlap layers 53. As one example, two-fold overlap layers 53 overlap with each other in widths corresponding to both flange parts 41, respectively.

Therefore, the reinforcing member 30, according to the exemplary embodiment of the present invention, may include both flange parts 41, the overlap layer 53, and a four-fold main reinforcing element 55 including a cross section of the strength reinforcing portion 10.

The main reinforcing element 55 may support the internal plane of the side of the strength reinforcing portion 10 corresponding to both flange parts 41 through the overlap layer 53, and cover both peripheries of the slit 11 through both flange parts 41 and reinforce the rigidity of the both peripheries of the slit 11.

Herein, the overlap part 51 of the reinforcing member 30 including the main reinforcing element 55 has a predetermined void 57 between the internal plane of the side of the strength reinforcing portion 10 and the overlap layer 53, that is, a separation portion.

Figure 3:
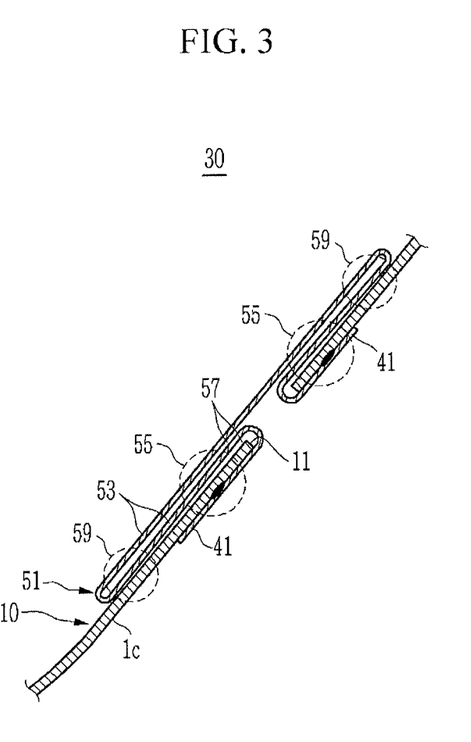
FIG. 3 is a diagram illustrating another example of the reinforcing member applied to the integrated hot stamping structure according to the exemplary embodiment of the present invention.

FIG. 3 is a diagram illustrating another example of the reinforcing member applied to the integrated hot stamping structure according to an exemplary embodiment of the present invention.

Referring to FIG. 3, as another example, the reinforcing member 30, according to the exemplary embodiment of the present invention, may configure the overlap layer 53 of the overlap part 51 to be extended externally to both flange parts 41. The overlap layer 53 is comprised by parts which overlap in the widths corresponding to both flange parts 41, respectively, and a part extended externally to both flange parts 41.

Therefore, the reinforcing member 30 according to the exemplary embodiment of the present invention may include both flange parts 41, parts corresponding to both flange parts 41 of the overlap layer 53, and a four-fold main reinforcing element 55 including the cross section of the strength reinforcing portion 10. In addition, the reinforcing member 30 may include a three-fold sub reinforcing portion 59 including the extended part of the overlap layer 53 and the cross section of the strength reinforcing portion 10.

The sub reinforcing portion 59 may support the internal plane of the side of the strength reinforcing portion 10 corresponding to an external portion of both flange parts 41, and reinforce the rigidity of both peripheries of the slit 11 together with the main reinforcing element 55 supporting the internal plane of the side of the strength reinforcing portion 10 corresponding to both flange parts 41 through the overlap layer 53 extended externally to both flange parts 41.

Even in the present case, the overlap part 51 of the reinforcing member 30 including the main reinforcing element 55 and the sub reinforcing portion 59 has the predetermined void 57 between the internal plane of the side of the strength reinforcing portion 10 and the overlap layer 53.

Hereinafter, an assembling method of the integrated hot stamping structure 100, according to the exemplary embodiment of the present invention, which is configured as above will be described in detail with the accompanying drawings.

Figure 4:
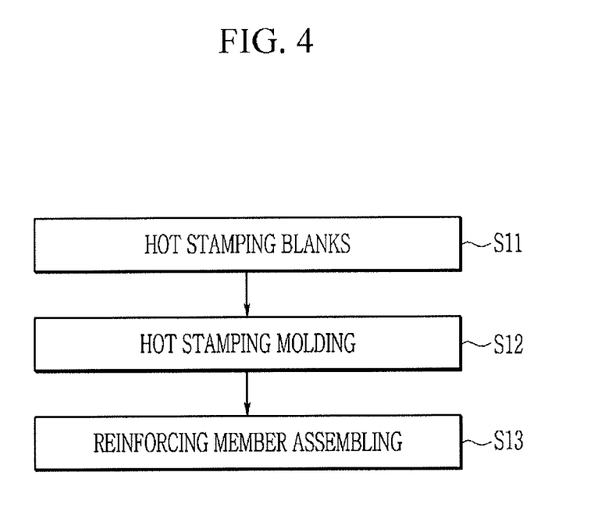
FIG. 4 is a flowchart for describing an assembling method of an integrated hot stamping structure according to an exemplary embodiment of the present invention.

FIG. 4 is a flowchart for describing an assembling method of an integrated hot stamping structure according to an exemplary embodiment of the present invention.

Referring to FIG. 4, first, the hot stamping blanks in which a plurality of raw material blanks are integrally coupled to each other are provided in the exemplary embodiment of the present invention (step S11). For example, the hot stamping blanks are TWBs in which the plurality of raw material blanks are integrally coupled with each other, and the blanks may include a roof side blank, a sill side blank, and an external pillar blank made of a predetermined steel material.

Next, in the exemplary embodiment of the present invention, the hot stamping blanks are hot stamping molded through a hot stamping mold (step S12). During such a process, when the hot stamping blanks are heated at a predetermined temperature and thereafter, molded with a press and rapidly cooled, a hot stamping molding body 101 (hereinafter, see FIG. 5A) including an integrated side panel may be manufactured.

Then, in the exemplary embodiment of the present invention, the reinforcing member 30 illustrated in FIG. 1 is assembled to the hot stamping molding body 101 (step S13). During such a process, the reinforcing member 30 is assembled to the hot stamping area of the predetermined strength reinforcing portion 10 configured for absorbing the shock in the hot stamping molding body 101.

Hereinafter, a process of assembling the reinforcing member 30 to the hot stamping molding body 101 will be described in detail with reference to the accompanying figures. FIG. 5A, FIG. 5B, FIG. 5C, FIG. 5D and FIG. 5E are diagrams for describing an assembling method of an integrated hot stamping structure according to an exemplary embodiment of the present invention.

Figure 5A:
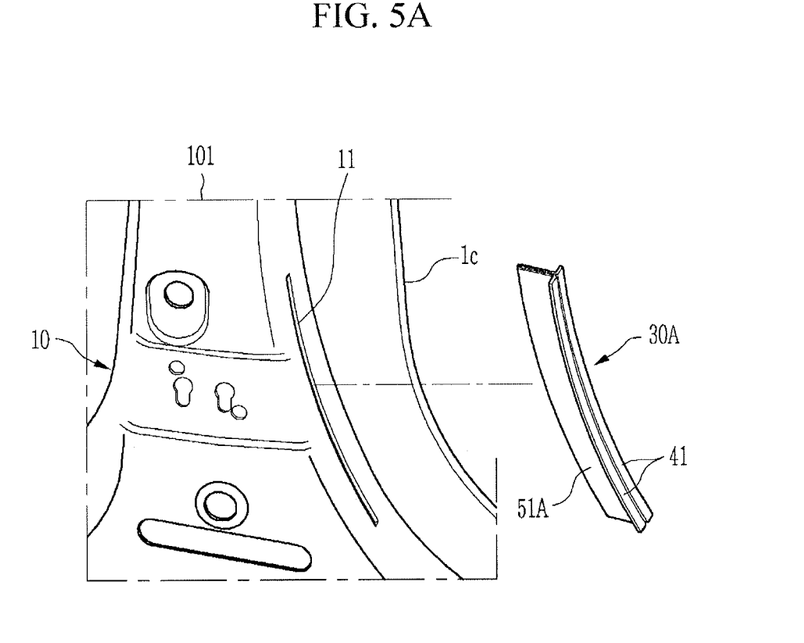
FIG. 5A, FIG. 5B, FIG. 5C, FIG. 5D and FIG. 5E are diagrams for describing an assembling method of an integrated hot stamping structure according to an exemplary embodiment of the present invention.

Referring to FIG. 5A, first, in the exemplary embodiment of the present invention, the slit 11 is processed, which is positioned in the lower portion of the external pillar 1c connected to the strength reinforcing portion 10 of the hot stamping molding body 101, that is, the sill side 1b (see FIG. 1), furthermore, on the side of the lower portion of the center external pillar. During such a process, the slit 11 is processed while forming the slit hole on the circumferential plane of the side in the vertical direction.

Then, in the exemplary embodiment of the present invention, a reinforcing member 30A to be assembled to the slit 11 on the side of the strength reinforcing portion 10 is provided. Herein, it may be defined that the reinforcing member 30A is not a shape having the overlap part 51 assembled to the side of the strength reinforcing portion 10 as illustrated in FIG. 2 and FIG. 3, but a shape before the overlap part 51 is formed.

The reinforcing member 30A, which is a state before assembling, includes both flange parts 41 and an insertion part 51A integrally connected to both flange parts 41. Both flange parts 41 may be provided as both peripheries in a longitudinal direction on a rectangular flat plate having a predetermined width.

In addition, the insertion part 51A may be formed by bending a part other than both peripheries with a predetermined length in an approximately 'U'-shape. The insertion part 51A may integrally connect the end portions of both flange parts 41 which face each other, and be inserted into the slit 11 on the side of the strength reinforcing portion 10. The reinforcing member 30A in the state before assembling is made of the soft steel material and, for example, both flange parts 41 and the insertion part 51A may be formed by the press molding.

Figure 5B:
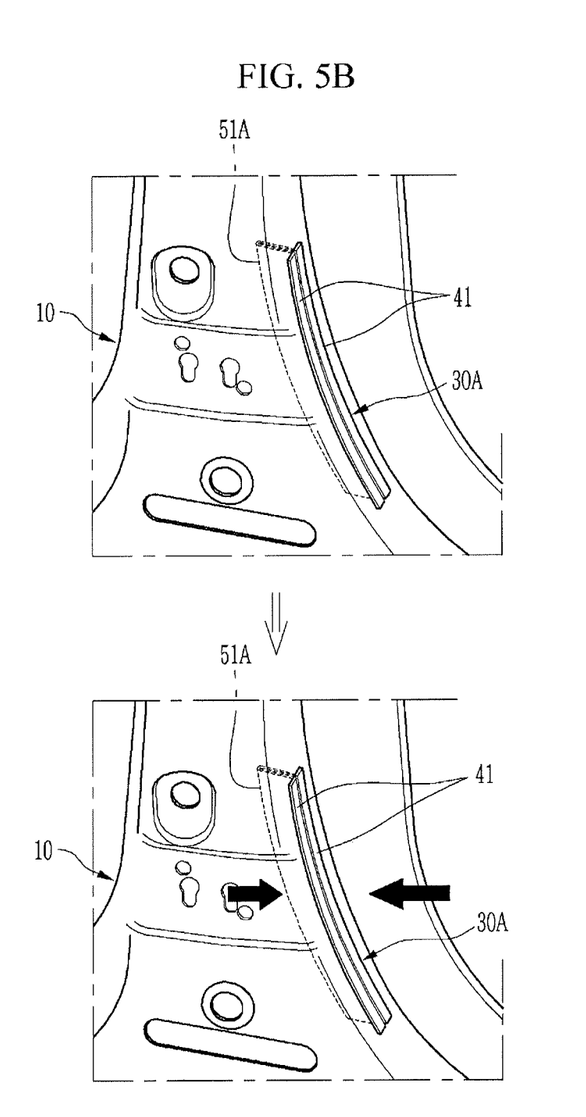

Next, in the exemplary embodiment of the present invention, as illustrated in FIG. 5B, the insertion part 51A of the reinforcing member 30A is inserted into the slit 11 (see FIG. 5A) on the side of the strength reinforcing portion 10. Then, both flange parts 41 of the reinforcing member 30A supports both peripheries of the slit 11 outside the side of the strength reinforcing portion 10. In addition, the insertion part 51A is mounted inside the side of the strength reinforcing portion 10.

In such a state, in the exemplary embodiment of the present invention, both flange parts 41A and the insertion part 51A are pressed by use of a presser in the related art. In the present case, the presser presses both flange parts 41 and the insertion part 51A in an arrow direction illustrated in FIG. 5B at both sides of the side with the side of the strength reinforcing portion 10 interposed therebetween.

Figure 5C:
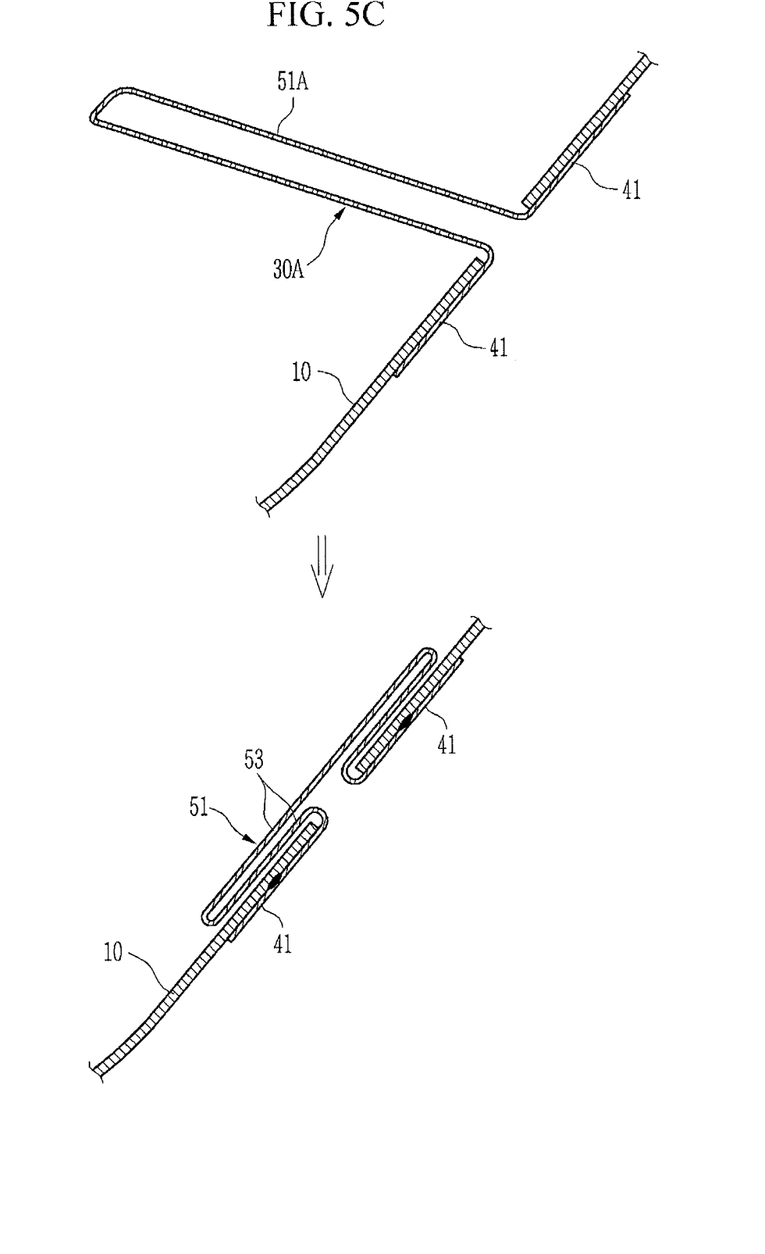

Therefore, in the exemplary embodiment of the present invention, as the insertion part 51A is pressed while both flange parts 41 are supported, the overlap part 51 which overlap in the width corresponding to each of both flange parts 41 is formed, as illustrated in FIG. 5C as one example.

Herein, the overlap part 51 is provided as two-fold overlap layers 53 which overlap in the widths corresponding to both flange parts 41, respectively and support the internal plane of the side of the strength reinforcing portion 10.

Figure 5D:
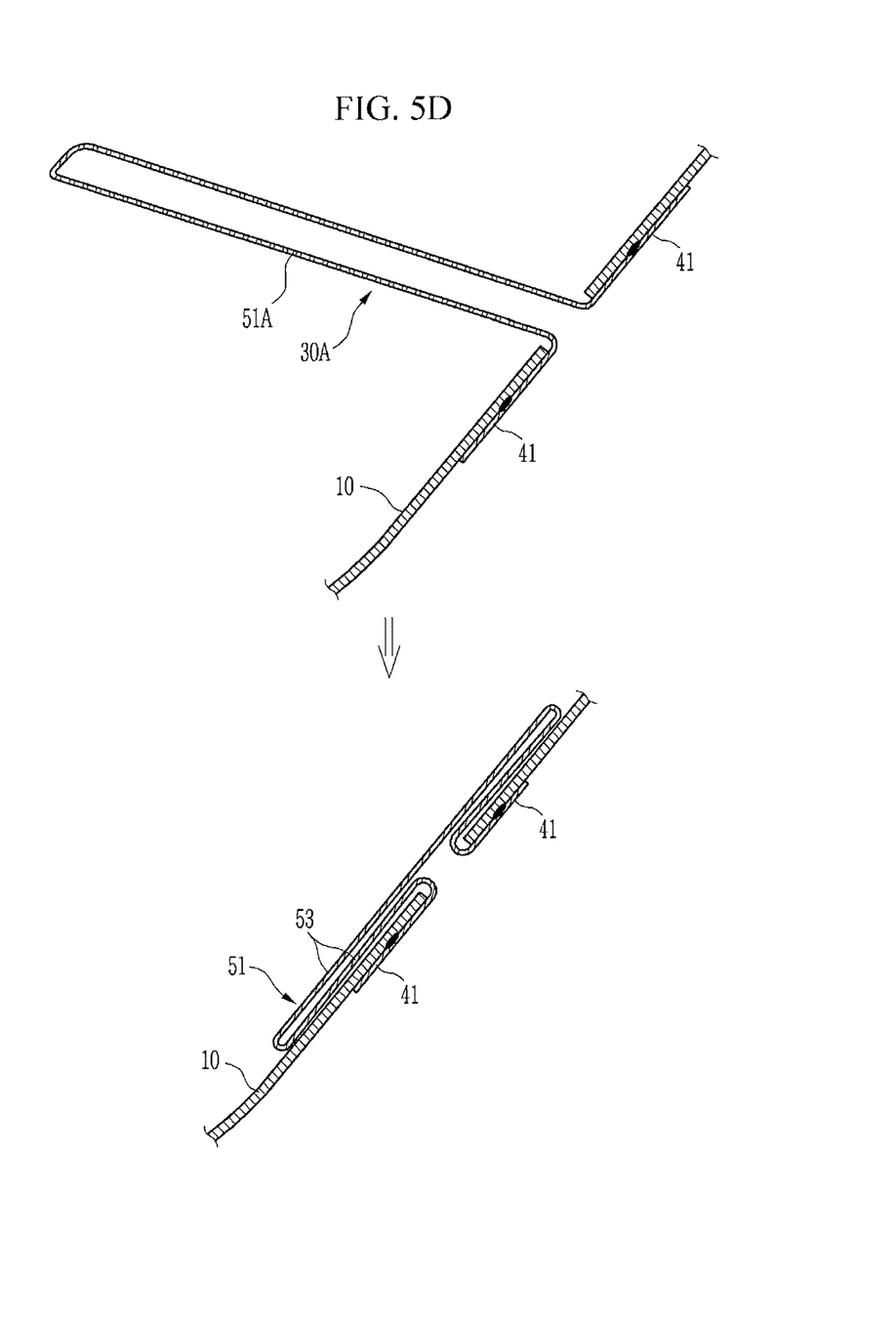

Meanwhile, in the exemplary embodiment of the present invention, as illustrated in FIG. 5D, as another example, the reinforcing member 30A in which the length of the insertion part 51A is extended may be provided, and the insertion part 51A may be pressed while the insertion part 51A is inserted into the slit 11.

Then, in the exemplary embodiment of the present invention, the overlap part 51 is formed, which includes the two-fold overlap layers 53 which overlap while being extended externally in the widths corresponding to both flange parts 41, respectively, and support the internal plane of the side of the strength reinforcing portion 10.

Figure 5E:
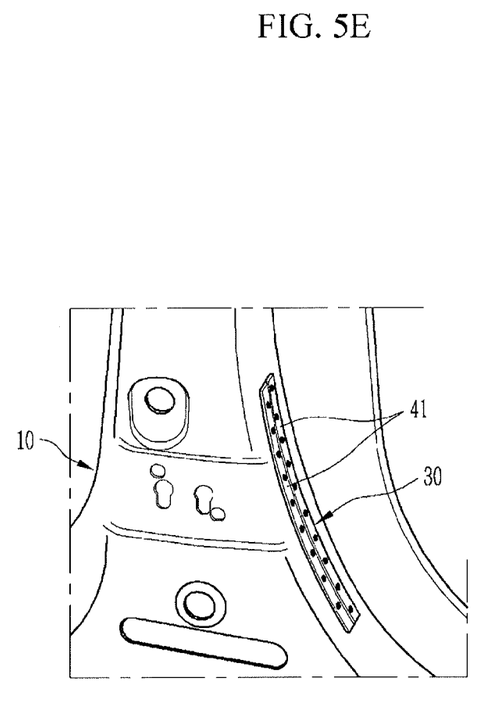

While the overlap part 51 is pressed and processed, when both flange parts 51 are welded to the side of the strength reinforcing portion 10 as illustrated in FIG. 5E in the exemplary embodiment of the present invention, assembling the reinforcing member 30 to the side of the strength reinforcing portion 10 is completed. During such a process, both flange parts 41 are bonded to the side of the strength reinforcing portion 10 by spot welding.

On the other hand, in the exemplary embodiment of the present invention, as the reinforcing member 30 is assembled to the side of the strength reinforcing portion 10 through the pressing and welding processes illustrated in FIG. 5B and FIG. 5C, the four-fold main reinforcing elements 55 may be configured, which includes both flange parts 41, the parts of the overlap layer 53 corresponding to both flange parts 41, and the cross section of the strength reinforcing portion 10 (see FIG. 2).

Further, in the exemplary embodiment of the present invention, as the reinforcing member 30 is assembled to the side of the strength reinforcing portion 10 through the pressing and welding processes illustrated in FIG. 5B and FIG. 5D, both flange parts 41, the three-fold sub reinforcing portion 59 may be configured, which includes the extended part of the overlap layer 53 and the cross section of the strength reinforcing portion 10 together with the main reinforcing element 55 (see FIG. 3).

Furthermore, the overlap part 51 of the reinforcing member 30 including the main reinforcing element 55 and the sub reinforcing portion 59 has the predetermined void 57 between the internal plane of the side of the strength reinforcing portion 10 and the overlap layer 53 (see FIG. 2 and FIG. 3).

By the integrated hot stamping structure 100 and the assembling method thereof, according to the exemplary embodiments of the present invention, which have been described above, the reinforcing member 30 is assembled to the external pillar 1c which is the portion that absorbs the shock when the vehicles collide with each other in the hot stamping strength reinforcing area configured to increase the cross section and the rigidity of the shock absorbing portion.

Furthermore, in the exemplary embodiment of the present invention, the main reinforcing element 55 and the sub reinforcing portion 59 are configured in the shock absorbing portion through the overlap part 51 of the reinforcing member 30 and the local void 57 is formed, and as a result, the cross section and the rigidity of the shock absorbing portion may be further increased.

Therefore, in the exemplary embodiment of the present invention, as the cross section and the rigidity of the shock absorbing portion are increased through the reinforcing member 30, the rupture and the partial rupture of the shock absorbing portion by the shock during the collision of the vehicle may be prevented through the reinforcing member, and as a result, collision performance may be improved.

Further, in the exemplary embodiment of the present invention, as the reinforcing member 30 is assembled to the shock absorbing portion of the hot stamping strength reinforcing area, the collision performance may be improved without a secondary processing procedure for local softening and high-frequency softening of the shock absorbing portion.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiment with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An integrated hot stamping structure formed by integrally coupling a plurality of blanks and hot stamping-molding the plurality of blanks, the integrated hot stamping structure comprising:
   a reinforcing member disposed in a hot stamping area of a predetermined strength reinforcing portion wherein the reinforcing member absorbs a shock and reinforces local rigidity of the strength reinforcing portion,
   wherein the reinforcing member is inserted into a vertical slit on at least one side of the strength reinforcing portion having a first side and a second side, supports an external plane and an internal plane of the at least one side, and is welded to the external plane,
   wherein the reinforcing member includes first and second flange parts which extend to first and second peripheries of the slit, and support the external plane of the at least one side and is welded to the external plane, and an overlap part which is integrally connected to the first and second flange part and supports the internal plane of the at least one side, and
   wherein the overlap part is provided as at least two-fold overlap layers.

2. The integrated hot stamping structure of claim 1, wherein the reinforcing member includes a main reinforcing element of four folds or more, which includes the first and second flange parts, the overlap layer, and a cross section of the strength reinforcing portion.

3. The integrated hot stamping structure of claim 2, wherein the overlap part has a void between the internal plane of the at least one side and the overlap layer.

4. The integrated hot stamping structure of claim 1, wherein the overlap layer is provided to be extended externally to the first and second flange parts.

5. The integrated hot stamping structure of claim 4, wherein the reinforcing member includes a main reinforcing element of four folds or more, which includes the first and second flange parts, the overlap layer, and a cross section of the strength reinforcing portion.

6. The integrated hot stamping structure of claim 5, wherein the reinforcing member includes a sub-reinforcing portion of three folds or more, which includes an extended part of the overlap layer and the cross section of the strength reinforcing portion.

7. The integrated hot stamping structure of claim 6, wherein the overlap part has a void between the internal plane of the at least one side and the overlap layer.

8. The integrated hot stamping structure of claim 1, wherein the reinforcing member is made of a soft steel material.

9. The integrated hot stamping structure of claim 1,
   wherein the integrated hot stamping structure includes an integrated side panel, and
   wherein the strength reinforcing portion includes a lower portion of an external pillar of the side panel.

\* \* \* \* \*